(12) United States Patent
Sugo

(10) Patent No.: US 7,163,986 B2
(45) Date of Patent: Jan. 16, 2007

(54) SILOXANE COPOLYMER, MAKING METHOD, AND THERMOSETTING RESIN COMPOSITION

(75) Inventor: Michihiro Sugo, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 326 days.

(21) Appl. No.: 10/856,758

(22) Filed: Jun. 1, 2004

(65) Prior Publication Data

US 2004/0242829 A1 Dec. 2, 2004

(30) Foreign Application Priority Data

Jun. 2, 2003 (JP) ............... 2003-156226

(51) Int. Cl.
*C08G 77/26* (2006.01)
(52) U.S. Cl. ............ 525/431; 525/476; 528/31; 528/32; 528/26; 528/28
(58) Field of Classification Search ............ 528/31, 528/26, 28, 32; 525/431, 476
See application file for complete search history.

(56) References Cited

U.S. PATENT DOCUMENTS

| 4,404,350 | A | * | 9/1983 | Ryang | 528/26 |
| 4,472,565 | A | * | 9/1984 | Ryang | 528/26 |
| 4,533,737 | A | * | 8/1985 | Ryang | 548/110 |
| 4,595,732 | A | * | 6/1986 | Ryang | 525/417 |
| 6,538,093 | B1 | * | 3/2003 | Sugo et al. | 528/28 |
| 6,703,133 | B1 | * | 3/2004 | Sugo et al. | 428/447 |

FOREIGN PATENT DOCUMENTS

| EP | 1 184 403 A2 | 6/2001 |
| EP | 1 396 515 A1 | 3/2004 |
| JP | 4-4213 A | 8/1992 |
| JP | 8-34851 A | 2/1996 |
| JP | 10-195278 A | 7/1998 |
| JP | 2003-20337 A | 1/2003 |
| JP | 2004-99638 A | 4/2004 |

* cited by examiner

*Primary Examiner*—Margaret G. Moore
(74) *Attorney, Agent, or Firm*—Birch, Stewart, Kolasch & Birch, LLP

(57) ABSTRACT

Novel siloxane copolymers have a structure as shown below. They can be applied and heat treated at relatively low temperatures into cured resin coatings which have satisfactory solvent resistance, durability, and good adhesion and bond to metal substrates such as copper even under humid conditions.

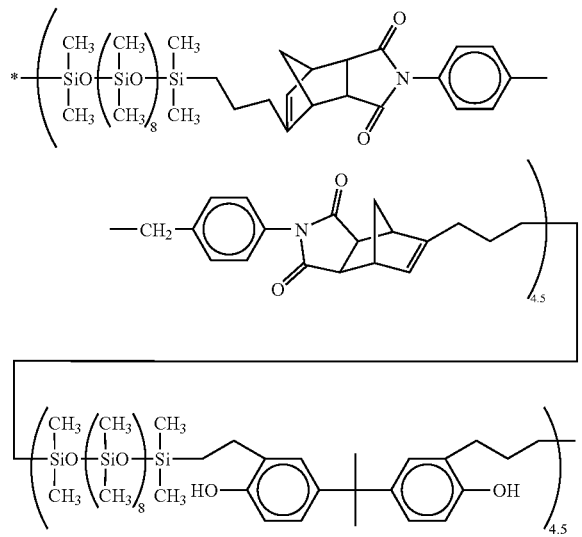

6 Claims, No Drawings

SILOXANE COPOLYMER, MAKING METHOD, AND THERMOSETTING RESIN COMPOSITION

This Non-provisional application claims priority under 35 U.S.C. § 119(a) on Patent Application No(s). 2003-156226 filed in Japan on Jun. 2, 2003, the entire contents of which are hereby incorporated by reference.

TECHNICAL FIELD

This invention relates to novel siloxane copolymers containing imido bonds and epoxy reactive radicals, having improved heat resistance, solvent resistance, adhesion and bond to substrates, a method for preparing the same, a thermosetting resin composition comprising the same, and a cured coating thereof.

BACKGROUND ART

Because of excellent heat resistance and electrical insulation, polyimide resins are widely used as resin varnish for electronic parts and base material for flexible printed circuit boards. However, the polyimide resins suffer from several problems including the lack of flexibility due to rigidity, awkward use because of a high glass transition temperature, and minimized solubility in organic solvents. Then a variety of silicone-modified polyimide resins have been proposed, as described, for example, in JP-A 10-195278 and JP-A 8-34851. These silicone-modified polyimide resins are improved in substrate bond and electrical properties while overcoming the above problems.

The synthesis of prior art silicone-modified polyimide resins is carried out, for example, by reacting an acid dianhydride with a diamine compound to form a polyamic acid, followed by ring-closing polyimide-forming reaction at high temperatures above 150° C. That is, the synthesis uses rigorous conditions and takes a long time. It would be desirable to have a resin material which has at least equal function to the prior art silicone-modified polyimide resins, can be synthesized more easily, and has the property of thermosetting. In this regard, the inventor discovered that an imide silicone resin is readily synthesized through hydrosilylation which is a relatively moderate reaction (see Japanese Patent Application No. 2002-259317). A thermoset resin coating resulting from this imide silicone resin has excellent resistance to solvent, humidity and the like, but requires a longer time to cure when the curing temperature is of the order of 100° C. A curing temperature in excess of 200° C. is necessary to complete brief curing. This limits the range of material and application with which the resin can be used.

A composition comprising a bisnadimide-polysiloxane alternating copolymer and an epoxy resin has been proposed as finding use in electronic materials, especially semiconductor-encapsulation resins (see, for example, JP-A 2003-20337). In this composition, however, the bisnadimide-polysiloxane alternating copolymer is used merely as an additive for stress reduction and heat resistance improvement rather than reacting with the epoxy resin. This indicates a likelihood that the passage of time induces phase separation between the bisnadimide-polysiloxane alternating copolymer and the epoxy resin, leading to a loss of reliability.

SUMMARY OF THE INVENTION

An object of the invention is to provide novel siloxane copolymers having a sufficient level of reliability to meet the above-described demand, a method for preparing the same, a thermosetting resin composition comprising the same, and a cured coating thereof.

In a first aspect, the invention provides a siloxane copolymer having a structure represented by the general formula (1).

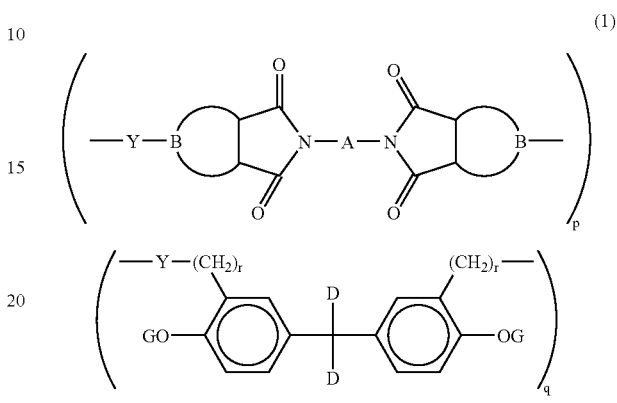

Herein A is a divalent organic radical, B is each independently a trivalent radical selected from Group B shown below, in which a pair of valence bonds extending in substantially the same direction bond with the imide ring to form a ring, Y is a divalent radical of the general formula (2) shown below, p and q are integers of at least 1, satisfying $2 \leq p+q \leq 200$, r is an integer of 2 to 8, D is hydrogen, methyl or trifluoromethyl, and G is hydrogen or glycidyl.

Group B:

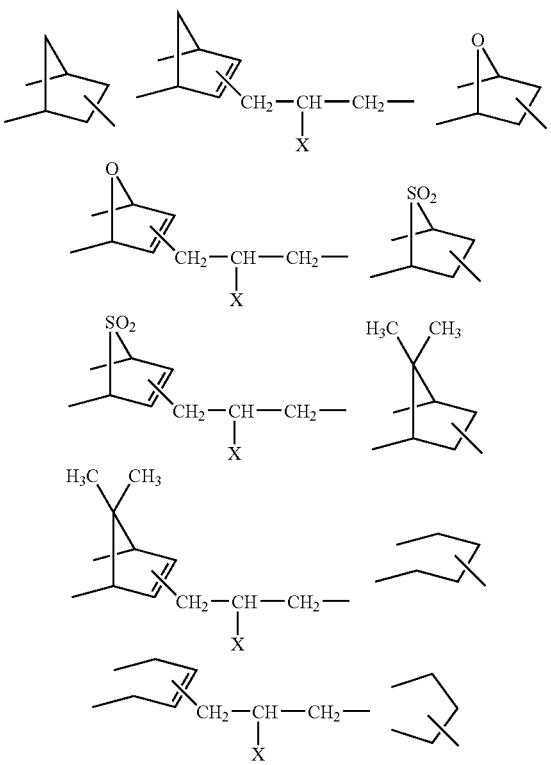

-continued

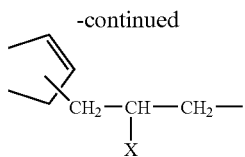

Herein X is hydrogen or methyl.

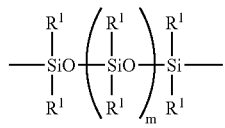
(2)

Herein $R^1$ is each independently a monovalent organic radical and m is an integer of 0 to 100.

In a second aspect, the invention provides a method for preparing a siloxane copolymer, comprising effecting addition reaction of an organopolysiloxane of the general formula (4) to an imide compound of the general formula (5) and an unsaturated bond-containing compound of the general formula (6).

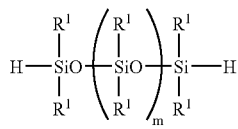
(4)

Herein $R^1$ is each independently a monovalent organic radical, and m is an integer of 0 to 100.

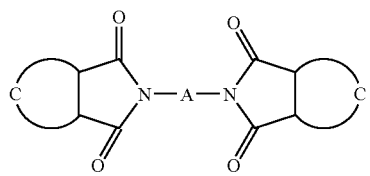
(5)

Herein A is a divalent organic radical, and C is each independently a divalent radical selected from Group C shown below:

Group C:

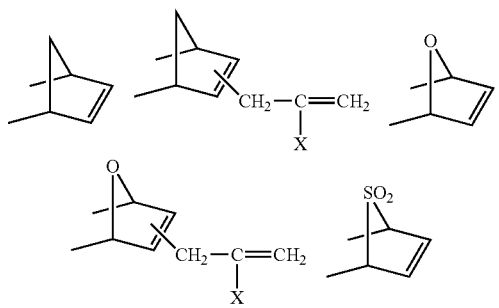

-continued

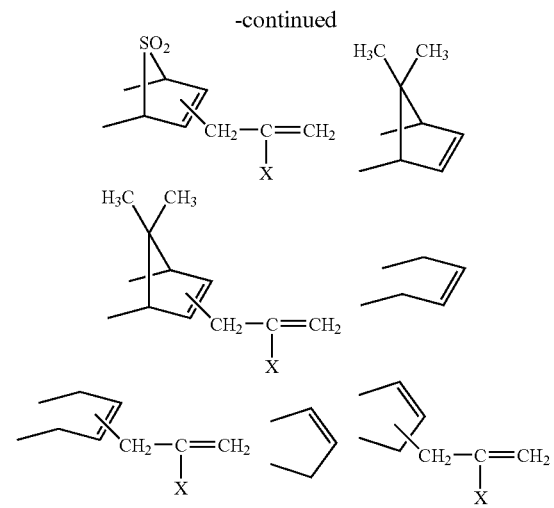

wherein X is hydrogen or methyl.

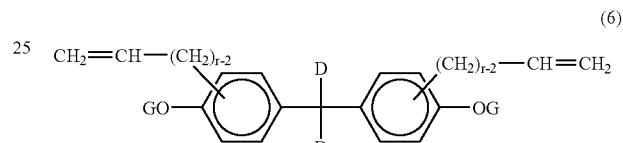
(6)

Herein r is an integer of 2 to 8, D is hydrogen, methyl or trifluoromethyl, and G is hydrogen or glycidyl.

In a third aspect, the invention provides a thermosetting resin composition comprising 100 parts by weight of the foregoing siloxane copolymer, 1 to 100 parts by weight of an epoxy resin, and 0.001 to 20 parts by weight of a curing accelerator.

In a fourth aspect, the invention provides a cured resin coating obtained by curing the siloxane copolymer-containing thermosetting resin composition at a temperature of up to 200° C.

DESCRIPTION OF THE PREFERRED EMBODIMENTS

Siloxane Copolymer

The siloxane copolymer of the invention has a structure represented by the general formula (1).

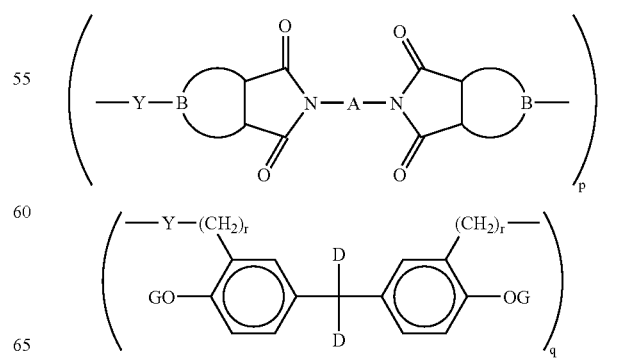
(1)

Herein A is a divalent organic radical, preferably selected from Group A shown below. B is each independently a trivalent radical selected from Group B shown below, in which a pair of valence bonds extending in substantially the same direction bond with the imide ring to form a ring. Note that bond sites are depicted by dots (•) in the formulae. Y is a divalent radical of the general formula (2) shown below. The subscripts p and q are integers of at least 1, satisfying $2 \leq p+q \leq 200$, preferably $2 \leq p+q \leq 140$, and r is an integer of 2 to 8, preferably 2 to 3. D is hydrogen, methyl or trifluoromethyl. G is hydrogen or glycidyl.

It is preferred that the siloxane copolymer have a number average molecular weight of 1,000 to 100,000, especially 3,000 to 50,000, as measured by gel permeation chromatography (GPC).

Also preferably, p and q satisfy $0.1 \leq p/(p+q) \leq 0.9$, more preferably $0.3 \leq p/(p+q) \leq 0.8$. If $p/(p+q)$ is less than 0.1, bond may be worsened. If $p/(p+q)$ is more than 0.9, indicating a less number of crosslinking sites, a satisfactory cured coating may not be obtained.

Group A:

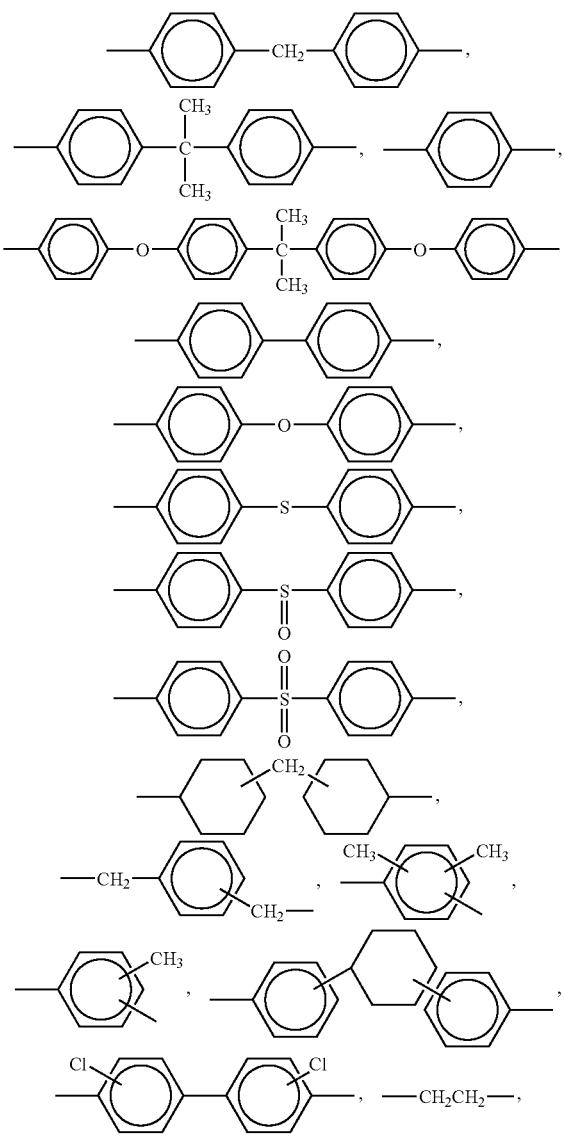

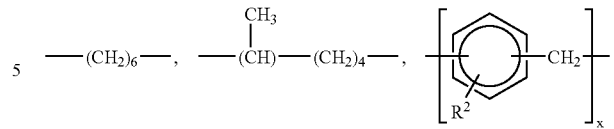

Herein, $R^2$ is a substituted or unsubstituted monovalent hydrocarbon radical, typically an alkyl radical of 1 to 10 carbon atoms, preferably 1 to 6 carbon atoms, and x is an integer of 1 to 20, preferably 1 to 10.

Group B:

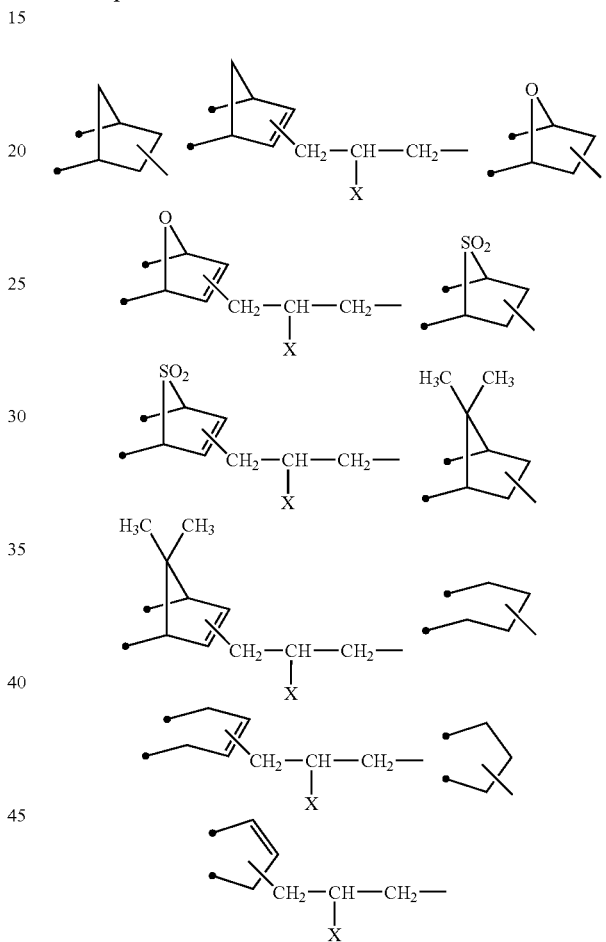

Herein X is hydrogen or methyl.

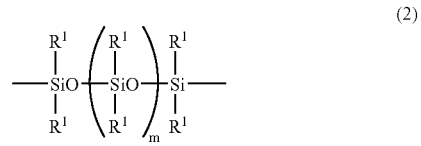

Herein $R^1$ is each independently a monovalent organic radical and m is an integer of 0 to 100.

More particularly, in Group A, examples of $R^2$ include alkyl radicals such as methyl, ethyl, propyl, butyl, pentyl and hexyl, cycloalkyl radicals such as cyclopentyl and cyclohexyl, aryl radicals such as phenyl, tolyl and xylyl, aralkyl radicals such as benzyl and phenethyl, and halogenated alkyl radicals such as 3,3,3-trifluoropropyl and 3-chloropropyl.

In formula (2), the monovalent organic radicals represented by $R^1$ include substituted or unsubstituted monovalent hydrocarbon radicals of 1 to 12 carbon atoms, preferably 1 to 8 carbon atoms, for example, alkyl radicals such as methyl, ethyl, propyl, butyl, pentyl and hexyl, cycloalkyl radicals such as cyclopentyl and cyclohexyl, aryl radicals such as phenyl, tolyl and xylyl, aralkyl radicals such as benzyl and phenethyl, halogenated alkyl radicals such as 3,3,3-trifluoropropyl and 3-chloropropyl, and trialkoxysilyl-containing alkyl radicals such as 2-(trimethoxysilyl)ethyl. Also included are alkoxy radicals such as methoxy, ethoxy and propoxy, aryloxy radicals such as phenoxy, cyano and trimethylsiloxy radicals.

The preferred siloxane copolymer has a structure represented by the general formula (3).

molecular chain), both end dimethylhydrogensiloxy group-capped dimethylsiloxane/methylphenylsiloxane copolymers, both end dimethylhydrogensiloxy group-capped dimethylsiloxane/diphenylsiloxane copolymers, and both end dimethylhydrogensiloxy group-capped methylphenylpolysiloxane. Preferred examples are given below although the organopolysiloxane which can be used herein is not limited thereto.

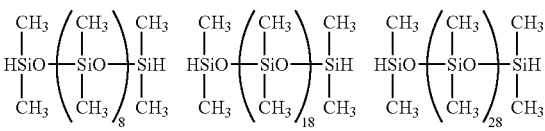

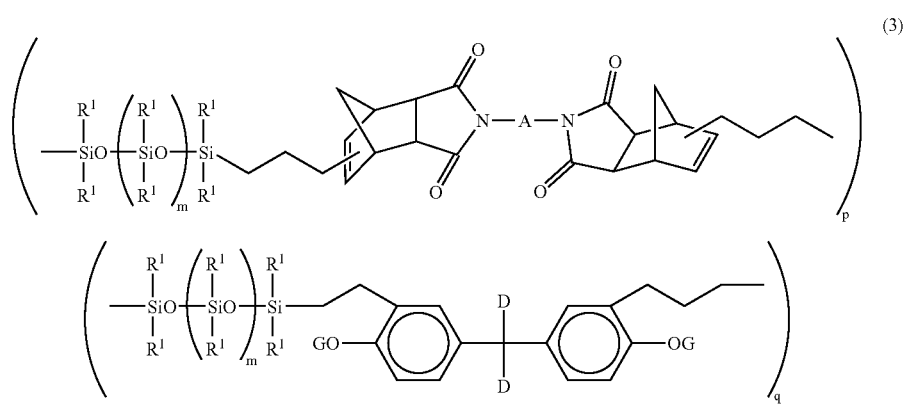

Herein $R^1$ is each independently a monovalent organic radical as defined above, A is a divalent organic radical as defined above, m is an integer of 0 to 100, p and q are integers of at least 1, satisfying $2 \leq p+q \leq 200$, preferably $2 \leq p+q \leq 140$, and $0.1 \leq p/(p+q) \leq 0.9$, preferably $0.3 \leq p/(p+q) \leq 0.8$.

Preparation of Siloxane Copolymer

Organopolysiloxane

The synthesis of the inventive siloxane copolymer uses an organopolysiloxane having two hydrogen atoms attached to terminal silicon atoms, represented by the general formula (4).

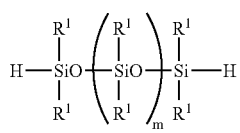

Herein $R^1$ is each independently a monovalent organic radical as defined above, and m is an integer of 0 to 100, preferably 0 to 60.

Illustrative, non-limiting examples of the organopolysiloxane include both end dimethylhydrogensiloxy group-capped dimethylpolysiloxane (dimethylpolysiloxane capped with dimethylhydrogensiloxy groups at both ends of the -continued

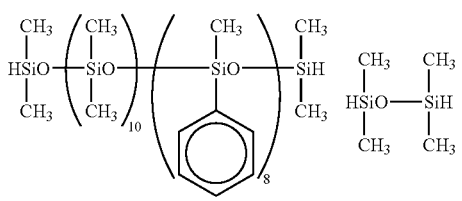

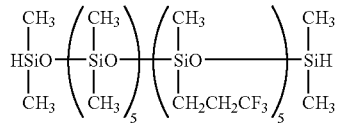

These organopolysiloxanes may be used alone or in admixture of any.

Imide Compound

For the synthesis of the inventive siloxane copolymer, use is also made of an imide compound having two addition reactive carbon-to-carbon double bonds, represented by the general formula (5).

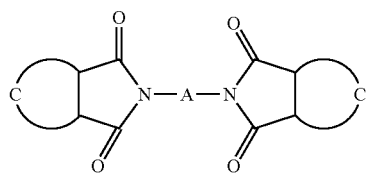
(5)

Herein A is a divalent organic radical as defined above, and C is each independently a divalent radical selected from Group C shown below.

Group C:

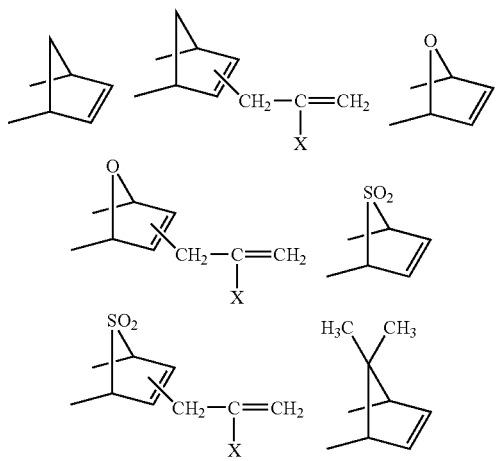

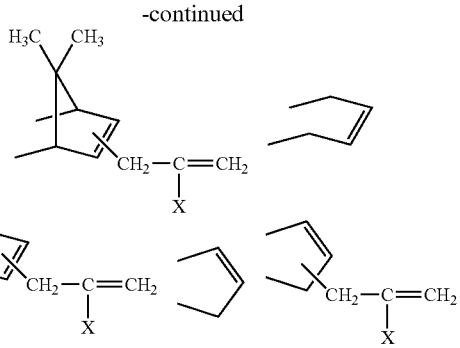
-continued

Herein X is hydrogen or methyl.

Of these, preferred is a divalent radical of the following formula wherein X is hydrogen or methyl.

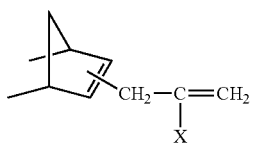

Also useful are imide compounds of the following general formula.

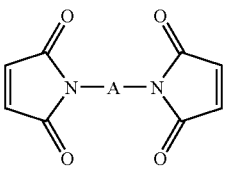

Herein A is a divalent organic radical as defined above.

Illustrative, non-limiting examples of the imide compounds which can be used herein are given below.

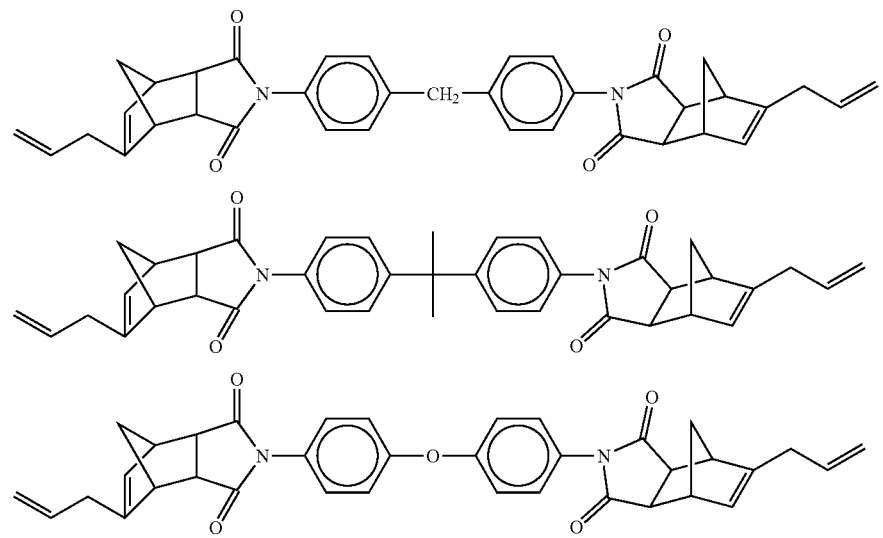

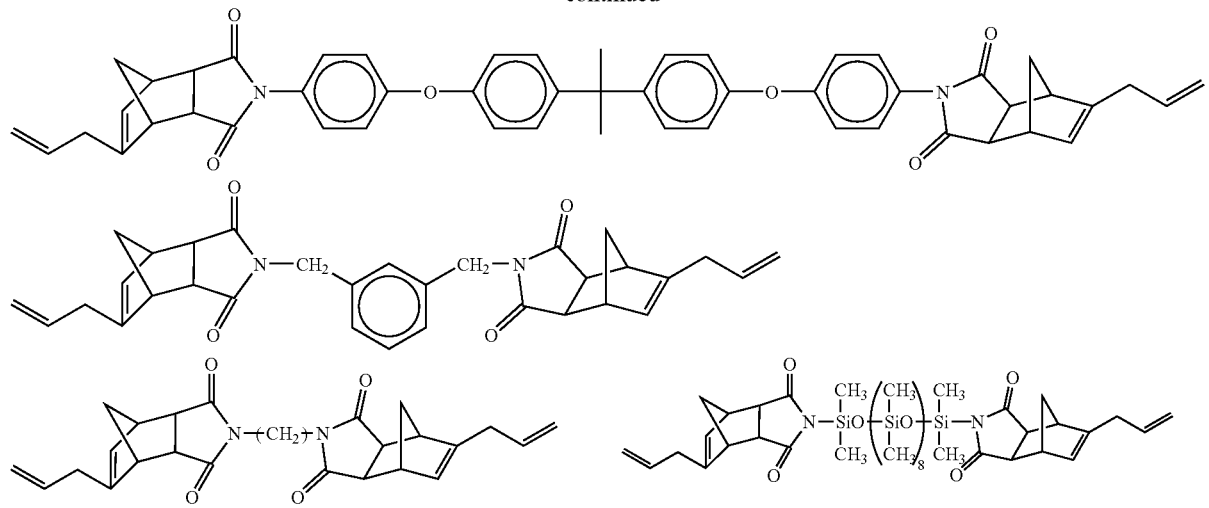

These imide compounds may be used alone or in admixture of any.

With respect to the reactivity of imide compounds, in the event an imide compound has both an endocyclic olefinic carbon-to-carbon double bond (divalent radical represented by —CH=CH—) and an olefinic carbon-to-carbon double bond (monovalent radical such as —CH=CH$_2$ or —CH$_2$—CH=CH$_2$) within a common molecule, the former (divalent radical) does not substantially participate in hydrosilylation reaction (addition to ≡SiH) and is inert and the latter (allyl, etc.) is solely active to the reaction.

Unsaturated Bond-Containing Compound

Also used for the synthesis of the inventive siloxane copolymer is an unsaturated bond-containing compound of the general formula (6).

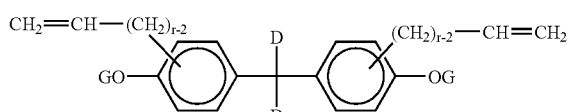

(6)

Herein r is an integer of 2 to 8, D is hydrogen, methyl or trifluoromethyl, and G is hydrogen or glycidyl.

Illustrative examples of the unsaturated bond-containing compound of formula (6) which can be used herein are shown below. These compounds have unsaturated bonds such as vinyl and allyl as well as hydroxyl radicals (capable of reacting with epoxy radicals) or epoxy radicals, ensuring that the inventive siloxane copolymer reacts with an epoxy compound which is one component of a thermosetting resin composition, for imparting an increased strength and improved reliability to a coating.

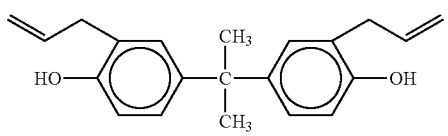

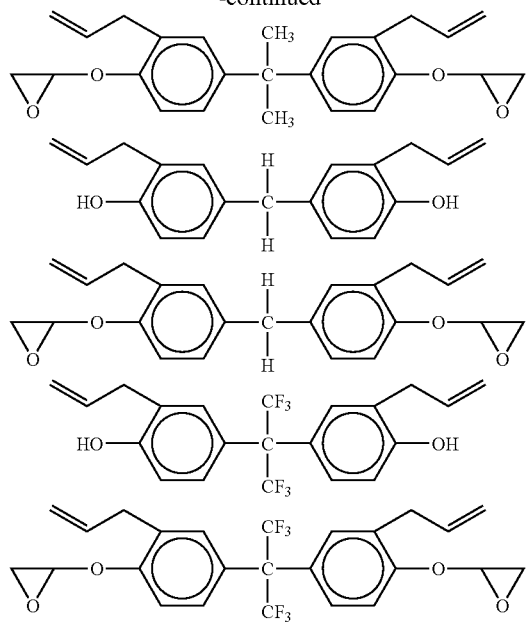

Addition Reaction

The method of preparing the inventive siloxane copolymer involves addition of two olefinic carbon-to-carbon double bond-containing compounds of formulae (5) and (6) to an organopolysiloxane of formula (4) through hydrosilylation (for example, addition of CH$_2$=CH— or —CH=CH— to ≡SiH). A catalyst is often used in this addition reaction. There may be used any of well-known catalysts, for example, platinum base catalysts such as chloroplatinic acid, alcohol solutions of chloroplatinic acid, platinum-olefin complexes, platinum-alkenylsiloxane complexes, and platinum-carbonyl complexes, rhodium base catalysts such as tris(triphenylphosphine)rhodium, and iridium base catalysts such as bis(cyclooctadienyl)dichloroiridium.

The amount of the addition reaction catalyst used may be a catalytic amount. Though not critical, the amount is generally about 0.001 to 20 parts by weight, preferably about 0.01 to 5 parts by weight per 100 parts by weight of the imide compound of formula (5), the unsaturated bond-containing compound of formula (6) and the organopolysiloxane of formula (4) combined.

A solvent may be omitted in the addition reaction, depending on the type of reactants used, although it is acceptable to use a solvent if necessary. Examples of suitable solvents, if used, include aromatic hydrocarbons such as benzene, toluene and xylene, ether compounds such as tetrahydrofuran and ethylene glycol butyl ether acetate, aliphatic hydrocarbons such as hexane and methylcyclohexane, and polar solvents such as N-methyl-2-pyrrolidone, γ-butyrolactone and cyclohexanone. The reaction temperature is preferably in the range of 60° C. to 120° C. and the reaction time is generally about 30 minutes to about 12 hours, though not critical.

In the addition reaction, provided that $\alpha$ is the equivalent amount of $\equiv$SiH radicals on the organopolysiloxane having at least two silicon atom-bonded hydrogen atoms (i.e., $\equiv$SiH) in a molecule and $\beta$ is the equivalent amount of olefinic carbon-to-carbon double bonds (active to hydrosilylation) on the imide compound of formula (5) having at least two olefinic carbon-to-carbon double bonds in a molecule and the unsaturated bond-containing compound of formula (6), these components are preferably combined so as to satisfy $0.5 \leq \alpha/\beta \leq 1.5$, more preferably $0.7 \leq \alpha/\beta \leq 1.3$. If this ratio is outside the range, either higher or lower than the range, the siloxane copolymer may sometimes fail to form a satisfactory cured resin coating.

Also, provided that $\gamma$ is the equivalent amount of olefinic carbon-to-carbon double bonds (active to hydrosilylation) on the imide compound of formula (5) and $\delta$ is the equivalent amount of olefinic carbon-to-carbon double bonds (active to hydrosilylation) on the unsaturated bond-containing compound of formula (6), the two components are preferably combined so as to satisfy $0.1 \leq \gamma/(\gamma+\delta) \leq 0.9$, more preferably $0.2 \leq \gamma/(\gamma+\delta) \leq 0.8$. If this ratio is lower than 0.1, bond may be worsened. If this ratio is higher than 0.9, a satisfactory cured coating may not be obtained on account of a reduced number of crosslinking sites.

Thermosetting Resin Composition

The third embodiment of the invention is a thermosetting resin composition comprising the inventive siloxane copolymer, an epoxy resin, and a curing accelerator.

Examples of suitable epoxy resins include phenol novolac type epoxy resins, cresol novolac type epoxy resins, bisphenol A type epoxy resins such as diglycidyl bisphenol A, bisphenol F type epoxy resins such as diglycidyl bisphenol F, triphenylmethane type epoxy resins such as triphenylolpropane triglycidyl ether, cycloaliphatic epoxy resins such as 3,4-epoxycyclohexylmethyl 3,4-epoxycyclohexanecarboxylate, resins derived from glycidyl esters such as diglycidyl phthalate, diglycidyl hexahydrophthalate and dimethylglycidyl phthalate, and resins derived from glycidylamines such as tetraglycidyl diaminodiphenylmethane, triglycidyl-p-aminophenol, diglycidyl aniline, diglycidyl toluidine and tetraglycidyl bisaminomethylcyclohexane. They may be used alone or in admixture of any. If necessary, a mono-functional epoxy compound having one epoxy radical in a molecule may be added to the epoxy resin.

An appropriate amount of the epoxy resin is 1 to 100 parts by weight, preferably 5 to 50 parts by weight per 100 parts by weight of the siloxane copolymer. Beyond the range, the composition may be undercured or cured parts become brittle.

Examples of suitable curing accelerators include organophosphine compounds such as triphenylphosphine and tricyclohexylphosphine; amino compounds such as trimethylhexamethylenediamine, diaminodiphenylmethane, 2-(dimethylaminomethyl)phenol, 2,4,6-tris(dimethylaminomethyl)phenol, and triethanolamine; and imidazole compounds such as 2-methylimidazole and 2-phenylimidazole. An appropriate amount of the curing accelerator added is 0.001 to 20 parts by weight, preferably 0.1 to 10 parts by weight per 100 parts by weight of the siloxane copolymer. More than 10 parts of the curing accelerator may have negative impact on the pot life.

The siloxane copolymer-containing thermosetting resin composition of the invention may take any desired form ranging from liquid to powder to film at room temperature, depending on a particular combination of siloxane copolymer, epoxy resin and curing accelerator. For ease of application, the thermosetting resin composition may be diluted with a solvent prior to use. Any desired solvent may be used as long as it is compatible with the thermosetting resin composition. Examples of suitable solvents include aromatic hydrocarbons such as benzene, toluene and xylene, ether compounds such as tetrahydrofuran and ethylene glycol butyl ether acetate, aliphatic hydrocarbons such as hexane and methylcyclohexane, ketone solvents such as acetone, 2-butanone and methyl isobutyl ketone, and polar solvents such as N-methyl-2-pyrrolidone, γ-butyrolactone, cyclohexanone and dimethylacetamide.

Other Components

In the siloxane copolymer-containing thermosetting resin composition of the invention, inorganic fillers may be incorporated if necessary. Examples of suitable inorganic fillers include fused silica, crystalline silica, alumina, carbon black, mica, clay, kaolin, glass beads, aluminum nitride, zinc oxide, calcium carbonate, and titanium oxide. The inorganic fillers may be used alone or in admixture. The amount of inorganic filler incorporated is preferably about 1 to 500 parts by weight per 100 parts by weight of the siloxane copolymer and epoxy resin combined, though not critical.

In the siloxane copolymer-containing thermosetting resin composition of the invention, electrically conductive substances may also be incorporated if necessary for imparting electric conductivity. Examples of suitable electrically conductive substances include metal particles such as gold, silver, copper and nickel, plastic particles having surfaces metallized, and conductive polymers such as polyacetylene, polypyrrole and polyaniline. These conductive substances may be used alone or in admixture of any. The amount of conductive substance incorporated is preferably about 100 to 1,000 parts by weight per 100 parts by weight of the siloxane copolymer and epoxy resin combined, though not critical.

To improve the adhesion and bond of a cured resin coating of the thermosetting resin composition of the invention to a substrate, carbon-functional silanes may be added to the composition if necessary. Examples of the carbon-functional silane include γ-glycidoxypropyltrimethoxysilane, γ-aminopropyltrimethoxysilane, 2-(γ-aminopropyl)ethyltrimethoxysilane, and vinyltrimethoxysilane. These silanes may be used alone or in admixture of any. The amount of carbon-functional silane incorporated is preferably about 0.1 to 10 parts by weight per 100 parts by weight of the siloxane copolymer and epoxy resin combined, though not critical.

Thermoset Resin Coating

A thermoset resin coating containing the siloxane copolymer can be obtained by applying the thermosetting resin composition of the invention to substrates of glass or metals (e.g., iron, copper, nickel and aluminum) or plastic substrates such as PET film or polyimide film directly (without solvent) or after it is diluted with a solvent (which can be used for the addition reaction) such as toluene, tetrahydrofuran or ethylene glycol butyl ether acetate. The solvent is evaporated off to form a coating. The coating is then heated at a temperature in the range of 40 to 200° C., preferably 80 to 150° C. for about 0.01 to 30 hours, preferably about 0.1 to 20 hours into a cured resin coating having a smooth surface and resistance to solvents such as alcohols, ketones and benzenes. The cured resin coating can have a thickness in the range of about 1 μm to about 1 cm although the thickness varies with a particular process. The cured resin coating is characterized by good adhesion and bond to the underlying substrate.

EXAMPLE

Examples of the invention are given below by way of illustration and not by way of limitation. All parts are by weight.

Example 1

Synthesis of Siloxane Copolymer

A 2-liter flask equipped with a stirrer, thermometer and nitrogen purge line was charged with 114 parts (0.2 mol) of an olefinic carbon-to-carbon double bond-containing imide compound represented by the formula:

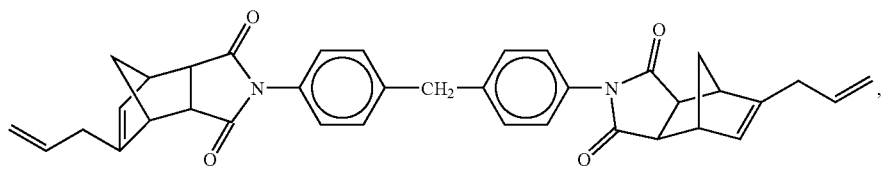

290 parts (0.4 mol) of an organopolysiloxane represented by the following average structural formula:

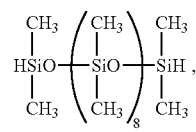

61 parts (0.2 mol) of diallyl bisphenol A and 500 parts of toluene, to which 0.3 part of a 2 wt % ethanol solution of chloroplatinic acid was added. The contents were stirred for 5 hours at 90° C. The solvent was removed from the reaction solution, yielding 405 parts of the target siloxane copolymer. This siloxane copolymer was a viscous fluid with a pale yellow clear appearance. It had a number average molecular weight of 10,500 as measured by gel permeation chromatography (GPC).

Based on the results of GPC and IR analysis, the siloxane copolymer was identified to have the following average structural formula.

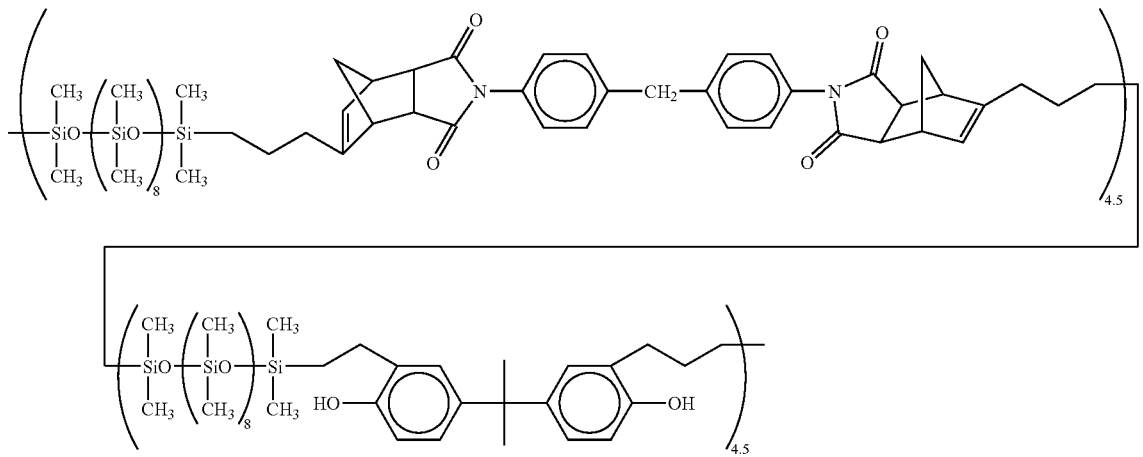

The results of IR analysis are shown below.

IR spectroscopy:
Alkane C—H stretching: 2,962 cm$^{-1}$
Imide C=O stretching: 1,778 cm$^{-1}$, 1,714 cm$^{-1}$
Imide C—N stretching: 1,379 cm$^{-1}$
Si—C stretching: 1,260 cm$^{-1}$
Si—O—Si stretching: 1,099 cm$^{-1}$ Example 2

Synthesis of Siloxane Copolymer

A 2-liter flask equipped with a stirrer, thermometer and nitrogen purge line was charged with 160 parts (0.28 mol) of an olefinic carbon-to-carbon double bond-containing imide compound represented by the formula:

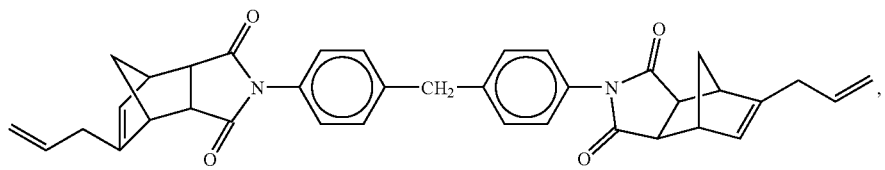

290 parts (0.4 mol) of an organopolysiloxane represented by the following average structural formula:

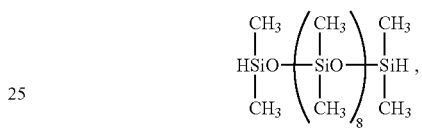

37 parts (0.12 mol) of diallyl bisphenol A and 500 parts of toluene, to which 0.3 part of a 2 wt % ethanol solution of chloroplatinic acid was added. The contents were stirred for 5 hours at 90° C. The solvent was removed from the reaction solution, yielding 430 parts of the target siloxane copolymer. This siloxane copolymer was a solid with a pale yellow clear appearance. It had a number average molecular weight of 17,000 as measured by GPC.

Based on the results of GPC and IR analysis, the siloxane copolymer was identified to have the following average structural formula.

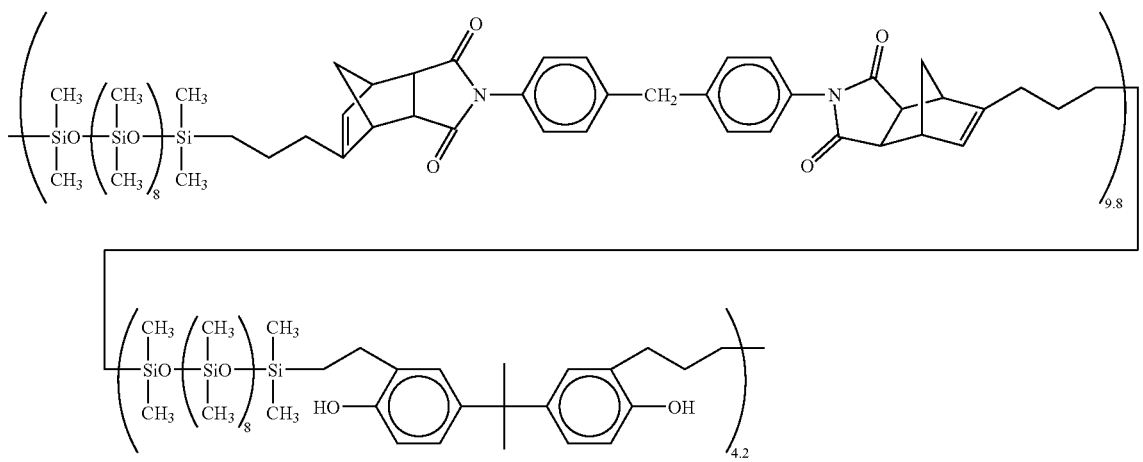

The results of IR analysis are shown below

IR spectroscopy:
Alkane C—H stretching: 2,962 cm$^{-1}$
Imide C=O stretching: 1,778 cm$^{-1}$, 1,714 cm$^{-1}$
Imide C—N stretching: 1,379 cm$^{-1}$
Si—C stretching: 1,260 cm$^{-1}$
Si—O—Si stretching: 1,099 cm$^{-1}$

Example 3

Synthesis of Siloxane Copolymer

A 2-liter flask equipped with a stirrer, thermometer and nitrogen purge line was charged with 102 parts (0.2 mol) of an olefinic carbon-to-carbon double bond-containing imide compound represented by the formula:

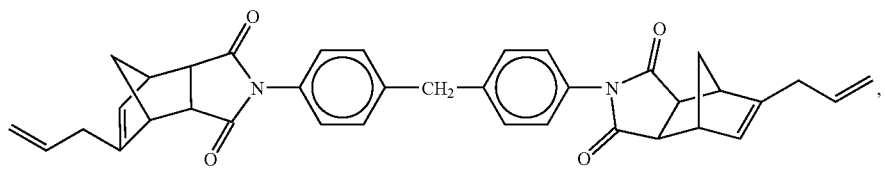

586.4 parts (0.4 mol) of an organopolysiloxane represented by the following average structural formula:

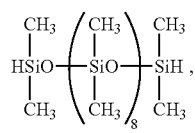

and 800 parts of toluene, to which 0.5 part of a 2 wt % ethanol solution of chloroplatinic acid was added. The contents were stirred for 2 hours at 90° C. Thereafter, 170 parts (0.28 mol) of diallyl bisphenol A was added dropwise, followed by 3 hours of stirring at 90° C. The solvent was removed from the reaction solution, yielding 684 parts of the target siloxane copolymer. This siloxane copolymer was a liquid with a pale yellow clear appearance, having a viscosity of 33.2 Pa·s. It had a number average molecular weight of 7,600 as measured by GPC.

Based on the results of GPC and IR analysis, the siloxane copolymer was identified to have the following average structural formula.

The results of IR analysis are shown below.

IR spectroscopy:

Alkane C—H stretching: 2,963 cm$^{-1}$

Imide C=O stretching: 1,771 cm$^{-1}$, 1,704 cm$^{-1}$

Imide C—N stretching: 1,379 cm$^{-1}$

Si—C stretching: 1,260 cm$^{-1}$

Si—O—Si stretching: 1,099 cm$^{-1}$

Comparative Example 1

Synthesis of Siloxane Copolymer

A 1-liter flask equipped with a stirrer, thermometer and nitrogen purge line was charged with 100 parts (0.175 mol) of an olefinic-carbon-to-carbon double bond-containing imide compound represented by the formula:

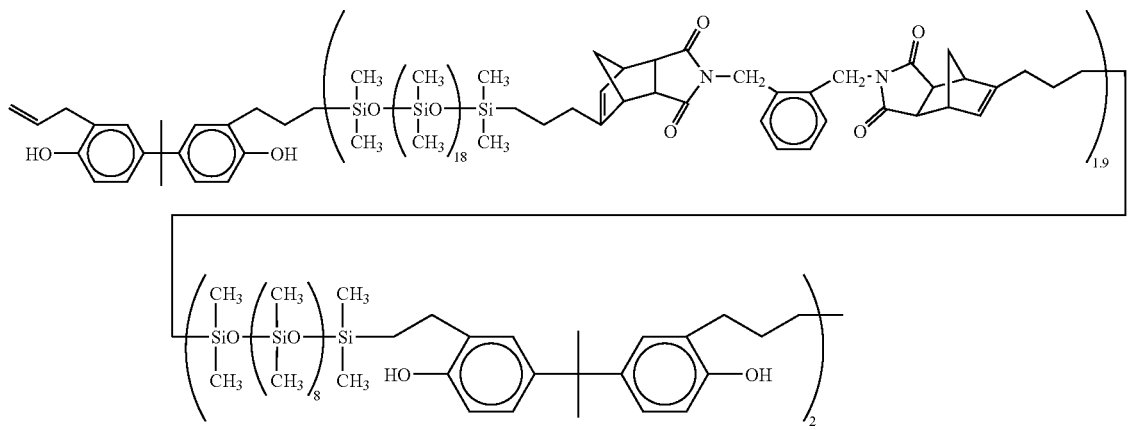

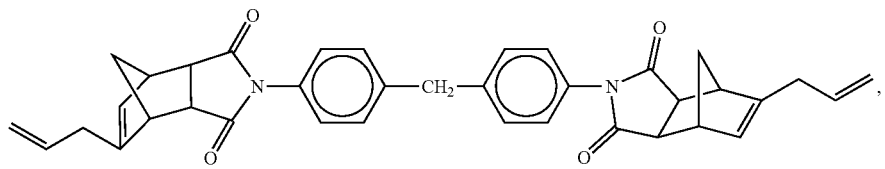

128 parts (0.176 mol) of an organopolysiloxane represented by the following average structural formula:

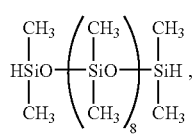

and 200 parts of toluene, to which 0.2 part of a 2 wt % ethanol solution of chloroplatinic acid was added. The contents were stirred for 5 hours at 90° C. The solvent was removed from the reaction solution, yielding 218 parts of the target siloxane copolymer. This siloxane copolymer was a solid with a pale yellow clear appearance. It had a number average molecular weight of 12,000 as measured by GPC.

Based on the results of GPC and IR analysis, the siloxane copolymer was identified to have the following average structural formula.

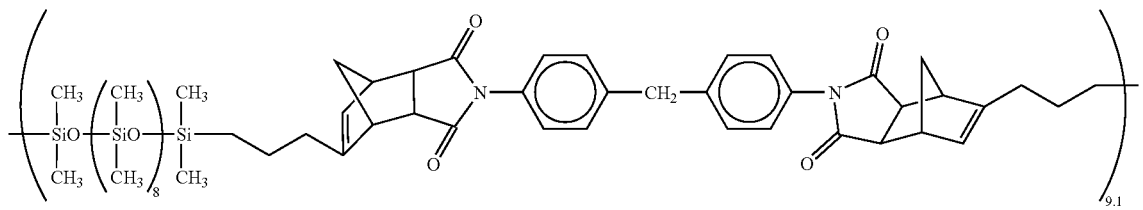

Example 4

Preparation of Cured Resin Coating

Thermosetting resin compositions were prepared by combining the siloxane copolymers obtained in Examples 1 to 3 or the siloxane copolymer obtained in Comparative Example 1 with an epoxy resin (GT or TGAPM) and a curing accelerator (2-MI) in accordance with the formulation shown in Table 1. When a diluent solvent was used, the composition was diluted with the solvent to form a resin solution having a concentration of 30 wt %. Note that GT stands for diglycidyl toluidine, TGAPM stands for tetraglycidyl diaminodiphenylmethane, and 2-MI stands for 2-methylimidazole.

Each resin composition was heated for 30 minutes at a temperature of 60° C. and then for one hour at a temperature of 150° C., forming a cured resin coating of 120 μm thick. Cured physical properties were measured, with the results shown in Table 2.

Separately, each resin composition was applied onto a glass substrate, heated for 30 minutes at a temperature of 60° C. and then for one hour at a temperature of 150° C., forming a cured resin coating of 90 μm thick on the substrate. The cured resin coating in close contact with the glass substrate was immersed in refluxing methyl ethyl ketone for 60 minutes, after which the surface of the coating was inspected for any change. The results are shown in Table 3. In the item of solvent resistance, "surface smooth" indicates that the coating surface was kept smooth even after solvent immersion, and "surface irregularities" indicates that the cured resin coating was swollen with methyl ethyl ketone so that the coating surface was deformed and became irregular.

Also separately, each resin composition was applied onto a copper substrate or glass substrate, heated for 30 minutes at a temperature of 60° C. and then for one hour at a temperature of 150° C., forming a cured resin coating of 15 μm thick on the substrate. The coated substrate was held in saturated steam under 2.1 atm. for 72 hours or in a hot air circulating oven at 150° C. for 240 hours. Thereafter, the cured coating was subjected to a crosshatch peel test (JIS K5400) for evaluating the adhesion after holding under hot humid conditions. The results are also shown in Table 3. In the item of peel test, the numerical value represents the number of remaining sections per 100 sections after peeling. Specifically, 100/100 means that all sections are kept adhered, and 0/100 means that all sections are peeled off.

Finally, each resin composition was applied onto a copper substrate and cured under the same conditions as above, forming a cured resin coating of 15 μm thick on the substrate. The coated substrate as a test specimen was examined for bend compliance by bending the specimen around a mandrel having a diameter of 2 mm. The results are shown in Table 3. The specimen was rated "OK" when the bend compliance was good, that is, neither separation of the coating from the substrate nor fracture of the coating occurred.

TABLE 1

| Thermosetting resin composition | Composition 1 | Composition 2 | Composition 3 | Composition 4 |
|---|---|---|---|---|
| Siloxane copolymer | Example 1 | Example 2 | Example 3 | Comparative Example 1 |

TABLE 1-continued

| Thermosetting resin composition | Composition 1 | Composition 2 | Composition 3 | Composition 4 |
|---|---|---|---|---|
| Amount (pbw) | 100 | 100 | 100 | 100 |
| Epoxy resin | GT | TGAPM | GT | GT |
| Amount (pbw) | 20 | 12 | 25 | 20 |
| Curing accelerator | 2-MI | 2-MI | 2-MI | 2-MI |
| Amount | 0.1 | 0.1 | 0.2 | 0.1 |
| Solvent | toluene | 2-butanone | — | toluene |
| Composition's appearance | yellow clear liquid | yellow clear liquid | white turbid fluid | yellow clear liquid |

TABLE 2

| Thermosetting resin composition | Composition 1 | Composition 2 | Composition 3 | Composition 4 |
|---|---|---|---|---|
| Modulus (MPa) | 340 | 260 | 29 | 250 |
| Glass transition temperature (° C.) | 55 | 50 | 25 | 50 |
| Break strength (MPa) | 17 | 11 | 4.5 | 4 |
| Elongation at break (%) | 60 | 110 | 40 | 90 |
| 5% weight loss (° C.) | 360 | 345 | 360 | 350 |

TABLE 3

| Thermosetting resin composition | | Composition 1 | Composition 2 | Composition 3 | Composition 4 |
|---|---|---|---|---|---|
| Solvent resistance | | surface smooth | surface smooth | surface smooth | surface irregularities |
| PCT resistance (crosshatch peel test) | Copper | 100/100 | 100/100 | 100/100 | 91/100 |
| | Glass | 100/100 | 100/100 | 100/100 | 95/100 |
| 150° C. heat resistance (crosshatch peel test) | Copper | 100/100 | 100/100 | 100/100 | 95/100 |
| | Glass | 100/100 | 100/100 | 100/100 | 97/100 |
| Bend compliance | | OK | OK | OK | OK |

The silicone copolymer and the thermosetting resin composition comprising the same according to the invention have the advantage that a cured resin coating can be readily formed through heat treatment at relatively low temperatures. The cured resin coating is fully resistant to organic solvents such as ketones, maintains good adhesion and bond to metal substrates such as copper even under humid conditions, and is durable. Then the thermosetting resin composition of the invention is useful as die bonding materials, underfill materials, surface protective materials for various metals, protective materials for semiconductor devices, surface protective materials and interlayer adhesives for electronic circuit boards, heat resistant adhesives, heat resistant paints, electrically conductive adhesive binders, etc.

Japanese Patent Application No. 2003-156226 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A siloxane copolymer having a structure represented by the general formula (1):

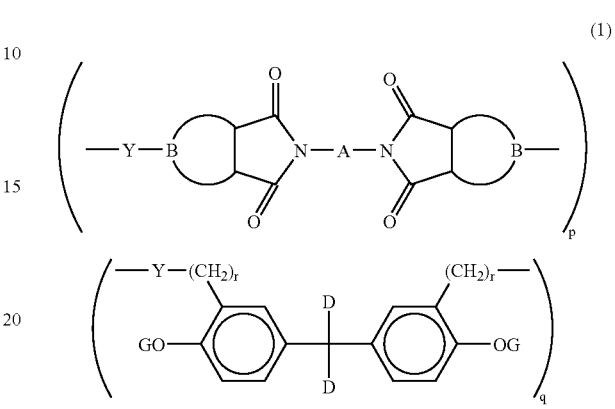

wherein A is a divalent organic radical, B is each independently a trivalent radical selected from Group B shown below, in which a pair of valence bonds extending in substantially the same direction bond with the imide ring to form a ring, Y is a divalent radical of the general formula (2) shown below, p and q are integers of at least 1, satisfying $2 \leq p+q \leq 200$, r is an integer of 2 to 8, D is hydrogen, methyl or trifluoromethyl, and G is hydrogen or glycidyl, Group B:

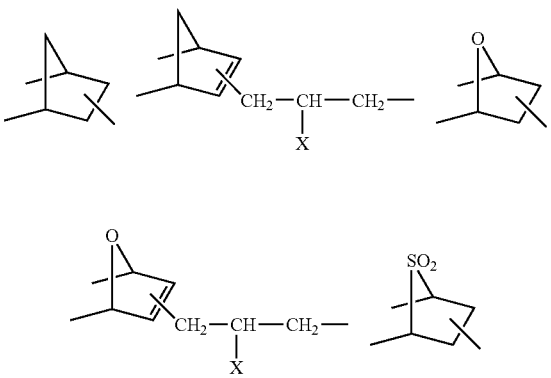

-continued

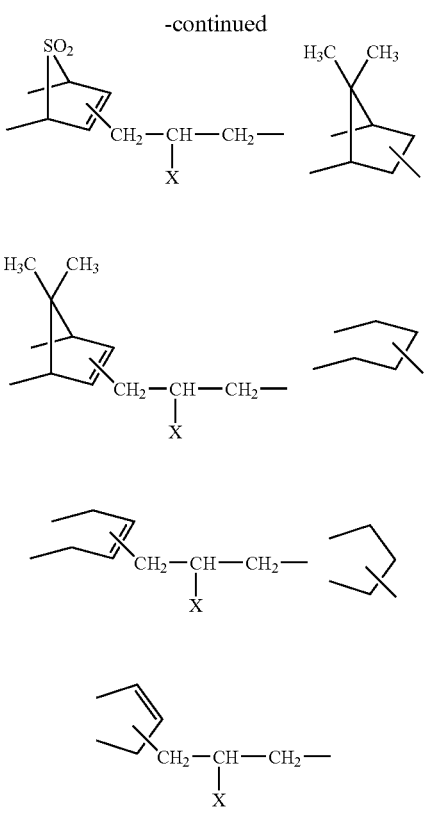

wherein X is hydrogen or methyl,

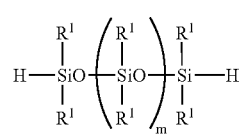 (2)

wherein $R^1$ is each independently a monovalent organic radical and m is an integer of 0 to 100.

2. The siloxane copolymer of claim 1, having a structure represented by the general formula (3):

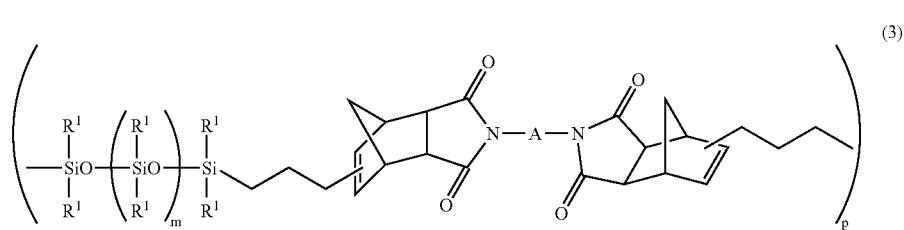

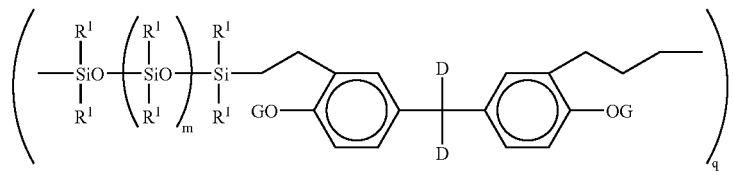 (3)

wherein $R^1$ is each independently a monovalent organic radical, A is a divalent organic radical, m is an integer of 0 to 100, p and q are integers of 1 to 100.

3. A thermosetting resin composition comprising 100 parts by weight of the siloxane copolymer of claim 1, 1 to 100, parts by weight of an epoxy resin, and 0.001 to 20 parts by weight of a curing accelerator.

4. A cured resin coating obtained by curing the siloxane copolymer-containing thermosetting resin composition of claim 3 at a temperature of up to 200° C.

5. A method for preparing the siloxane copolymer of claim 1, comprising effecting addition reaction of an organopolysiloxane of the general formula (4) to an imide compound of the general formula (5) and an unsaturated bond-containing compound of the general formula (6),

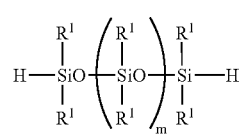 (4)

wherein $R^1$ is each independently a monovalent organic radical, and m is an integer of 0 to 100,

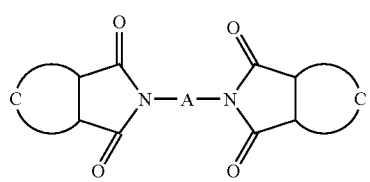 (5)

wherein A is a divalent organic radical, and C is each independently a divalent radical selected from Group C shown below, Group C:

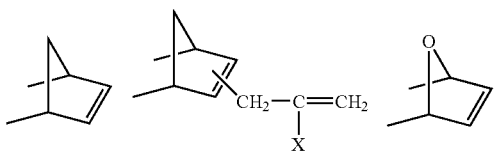

27
-continued
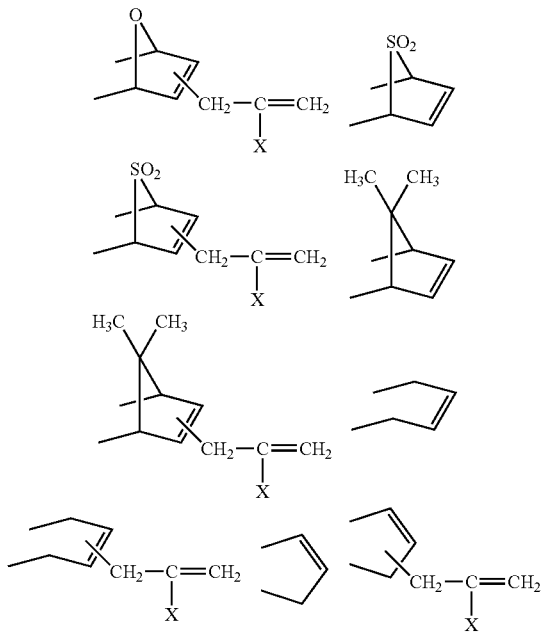
28
wherein X is hydrogen or methyl,
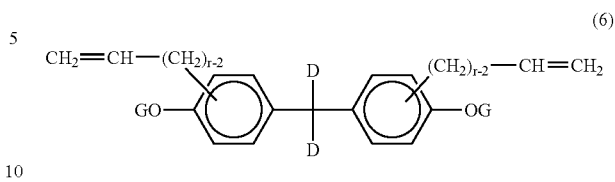
(6)
wherein r is an integer of 2 to 8, D is hydrogen, methyl or trifluoromethyl, and G is hydrogen or glycidyl.
6. The method of claim 4, wherein C in formula (5) is a divalent radical of the formula:
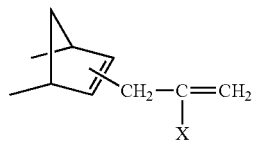
wherein X is hydrogen or methyl.
* * * * *